United States Patent [19]

Frame

[11] 4,439,788
[45] Mar. 27, 1984

[54] VIDEO IMAGING APPARATUS HAVING A PLIANT CLOCK

[75] Inventor: Wayne W. Frame, Longmont, Colo.

[73] Assignee: Ball Corporation, Muncie, Ind.

[21] Appl. No.: 343,385

[22] Filed: Jan. 27, 1982

[51] Int. Cl.$^3$ ............................................. H04N 3/14
[52] U.S. Cl. .................................. 358/213; 250/578; 358/109; 358/280
[58] Field of Search ............... 358/293, 294, 212, 213, 358/109, 280; 250/208, 578

[56] References Cited

U.S. PATENT DOCUMENTS

| | | | |
|---|---|---|---|
| 4,038,690 | 7/1977 | Hoagland | 358/213 |
| 4,068,266 | 1/1978 | Liao | 358/280 |
| 4,328,426 | 5/1982 | D'Ortenzio | 358/280 |

Primary Examiner—Joseph A. Orsino, Jr.

[57] ABSTRACT

A video imaging apparatus for scanning an area during relative motion in a direction defining a track axis has at least two linear sensors each comprised of at least one array of charge coupled devices. The sensors are oriented substantially perpendicular to the track axis thereby defining a cross-track axis. The arrays are further fixed relative to each other and oriented for simultaneously scanning the same area. A master clock signal is used to readout the data produced by the first sensor. A phase-locked loop produces a slaved, pliant, clock signal for reading the data out of the second sensor. By varying the phase of the slaved clock signal relative to the master clock signal, mechanical offset between the two sensors is compensated. By varying the average frequency of the slaved clock signal relative to the master clock signal, scale differences between the two sensors are compensated. By cyclically varying the instantaneous clock frequency along the cross-track axis of the salved clock signal relative to the master clock signal, lens distortion is compensated. Thus, by utilizing the phase-locked loop to control plural characteristics of the slaved clock signal, the retreival of data from the sensors may be more accurately coordinated and the necessity of costly, complex, off-line post-processing avoided.

22 Claims, 6 Drawing Figures

VIDEO IMAGING APPARATUS HAVING A PLIANT CLOCK

BACKGROUND OF THE INVENTION

The present invention is related generally to video imaging apparatus and more particularly to apparatus utilizing plural linear arrays of charge coupled devices scanned in a "push-broom" manner past a visual field.

It is well known in the prior art to provide sensors composed of arrays of charge coupled devices for video cameras or the like. An individual charge coupled device is a small semi-conductor device which accumulates electrical charge as an approximately linear function of the incident illumination intensity and the period of exposure. In one application (e.g., a "push-broom" video imaging camera for use in an earth satellite), a multisensor video camera utilizes a plurality of sensors, each composed of a plurality of linear arrays of charge coupled devices. Each linear array sensor is nominally focused on the same underlying area through separate respective lenses responsive to "light" (including the infra and ultra visual frequencies) of a predetermined frequency range. In this manner, each linear array sensor produces an image of an elemental portion of the predetermined area composed of light of a predetermined frequency range. The images produced by the various sensors may then be superimposed to produce a composite picture or they may be used separately to obtain information related to a particular range of light frequencies.

The production of a composite picture or comparative analysis of the separate video signals is often complicated by the fact that the sensors may be mechanically and/or electrically misaligned (e.g., as a function of temperature changes, etc.) such that the actual respective elemental areas focused upon are not exactly the same. Additional problems are encountered due to the fact that each sensor may have a separate optical system (e.g., lens) in whole or in part and any variation (e.g., as a function of temperature, etc.) between these different optics will cause scale differences as well as distortion.

The present invention is for a video imaging apparatus utilizing such multiple linear arrays of sensors and having circuitry electronically compensating for mechanical and/or electrical offset between sensors and electronically compensating for scale and distortion errors caused by variations between the optical systems associated with each different array.

BRIEF SUMMARY OF THE INVENTION

The present invention is for an improved multisensor video imaging apparatus of the type utilizing plural linear sensors comprised of arrays of charge coupled devices (CCD). Each incremental CCD active area monitors a corresponding incremental area of the presented optical field. These incremental portions of the optical field also correspond to incremental portions (called pixels) of a resulting recorded image.

The linear arrays are nominally fixed with respect to one another and simultaneously moved relative to a presented optical field in a direction defining a track axis. The length dimension of the linear arrays is oriented perpendicular to the track axis thereby defining a cross-track axis. The linear arrays are further oriented so as to simultaneously scan the same area of the presented optical field. The sensors in each array produce electrical signals, one set of samples defining one "line" of video data in the cross-track axis. By storing subsequent sets samples, a continuous series of contiguous line images is produced. Such "push-broom" types of video camera systems are well known in the art.

In accordance with this invention, a master clock is provided for producing a master clock signal. A first array driver is responsive to the master clock signal for sampling and reading the electrical signals produced by a first linear array sensor. A phase-locked loop is provided for each of the other linear arrays of sensors for producing slaved, pliant, clock signals. The pliant clock signals are supplied to respective array drivers for sampling and reading the electrical signals from each of the other sensors. Each phase-locked loop may comprise a voltage-controlled oscillator, a phase detector responsive to both the master clock signal and the output of the voltage-controlled oscillator and a summer responsive to the phase detector for producing the voltage for driving the voltage-controlled oscillator.

By controlling the relative phases of the pliant clock signals produced by the various phase-locked loops, offset correction in the cross-track axis is achieved. Thus, by advancing or retarding the phases of the pliant clock signals with respect to the master clock signal, mechanical misalignment between the first sensor and the other sensors may be compensated.

By adjusting the relative frequencies of the pliant clock signals produced by the various phase-locked loops, scale differences in the cross-track axis caused by respective lens variations may be compensated.

Finally, any distortion in the cross-track axis may be corrected by cyclically varying the instantaneous clock frequency of a given phase-locked loop along the cross-track axis by adding a suitable analog waveform to the signal produced by the phase detector. The present invention thus compensates for mechanical misalignment, scale and lens distortions by controlling the phase and frequency (both instantaneous and average) of the pliant clock signals provided for clocking each of the linear arrays.

In one embodiment of the present invention, memory is provided for storing a predetermined number of lines of video data produced by each linear array sensor. A controller then produces a composite line of video data which is a weighted average of the stored lines of data. In this manner, the ability to perform inter-pixel interpolation at any desired angle is provided so that angularly oriented offsets and distortions can be compensated.

DESCRIPTION OF THE PREFERRED EMBODIMENT

Figure 1:
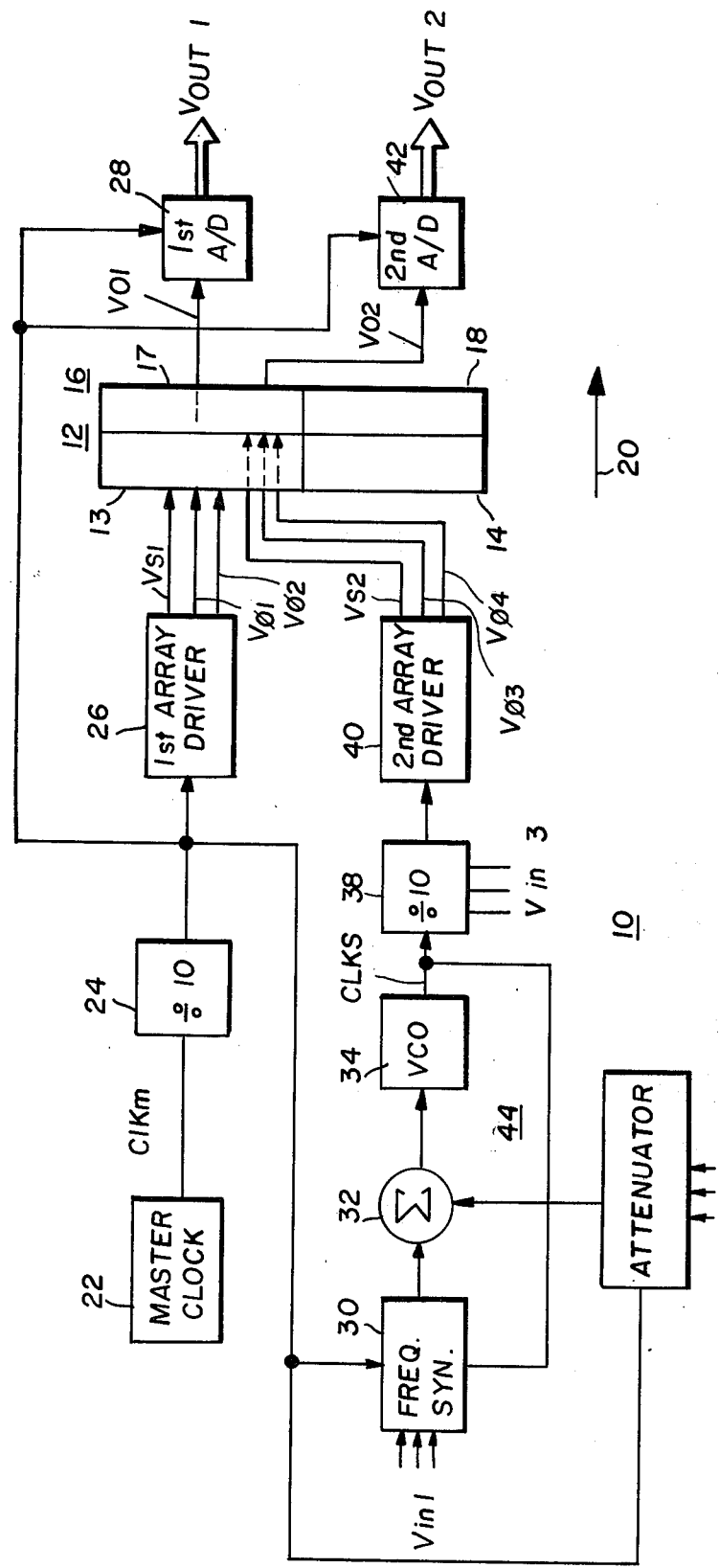
FIG. 1 is a simplified block diagram illustrating a multisensor video imaging apparatus constructed according to the teachings of the present invention.

In FIG. 1, a video imaging apparatus 10 constructed according to the teachings of the present invention is illustrated. The video imaging apparatus 10 has a first sensor 12 is a linear array of charge coupled devices which itself may comprise plural aligned linear arrays. For example, it may be comprised of a first linear array of charge coupled devices 13 and a second linear array of charge coupled devices 14. The video imaging apparatus has a second sensor 16 which is similar to sensor 12. For example, it may comprise a first linear array of charge coupled devices 17 and a second linear array of charge coupled devices 18. The video imaging apparatus 10 illustrated in FIG. 1 may be of the "push-broom" type typically found in earth satellites. In such a case, the first sensor 12 and the second sensor 16 are fixedly mounted with respect to one another. The satellite, not shown, moves in a direction defining a track axis illustrated by the arrow 20. The sensors 12 and 16 are mounted substantially perpendicular to the track axis thereby defining a cross-track axis. The sensors 12 and 16 are oriented so as to simultaneously scan, in synchronism, the same area of the underlying earth's surface as it passes. Each of the sensors 12 and 16 typically has a separate lens (not shown) through which each of the sensors scans the same strip area. The lenses, not shown, are typically responsive to "light" (including infra and ultra non-visual ranges) of a predetermined frequency (e.g. by use of suitable filtering) such that each of the sensors 12 and 16 produces an image of the same area but with each image resulting from "light" having different respective frequency ranges.

Track axis alignment can be achieved by mechanical means such as a stepping motor drive, not shown, for tilting the sensors 12 and 16 in the phase of the track axis. Angular differences between the sensors 12 and 16 can often also be permanently mechanically compensated for prior to flight. It should be recognized that there is no scale variation along the track axis since the sensors 12 and 16 are scanning with the same velocity, i.e. that of the satellite.

The arrays of charge coupled devices 13, 14, 17 and 18 produce electrical signals which are a linear function of the incident illumination intensity and the period of exposure. Each set of sample values of the electrical signals produced by arrays 13 and 14 and by arrays 17 and 18 defines one "line" of video data in the cross-track axis. By storing subsequent samples according to well known procedures, a continuous set of contiguous line images of the area is produced. However, nstead of using complex post-processing techniques to resample the two images to bring them into alignment in the cross-track axis (as often required in the prior art), real time on-line cross-track alignment compensation is achieved in accordance with this invention by reading out the lines of data with two different clock signals, one master, the other a controlled, slaved version thereof. A one to two percent blanking period is inserted at the end of each readout sequence. Compensation for misalignment, or mechanical offset, in the cross-track axis is then achieved by introducing a proper phase shift between the two clock signals. The readout period plus the blanking period must sum to the same interval for each clock signal thus allowing these signals to be locked together over the long term.

Returning to FIG. 1, a master clock 22 produces a master clock signal Clkm which is input to a divider 24. The divider 24 divides the master clock signal Clkm by a predetermined factor such as ten. The divided master clock signal is input to a first array driver 26. From the divided master clock signal the first array driver 26 produces a first sample signal $V_{s1}$ and two clock signals $V_{\phi1}$ and $V_{\phi2}$, all of which are input to the first array 12. In response to the sample signal $V_{s1}$, the electrical charges (e.g., 1024) accumulated by the charge coupled devices in this array are transferred to an analog shift register internal to the array. The charge accumulated by each of the charge coupled devices and input to the shift register in response to the first sample signal $V_{s1}$ is then serially output from the first sensor 12 in response to the clock signals $V_{\phi1}$ and $V_{\phi2}$. This serial data output train $V_{01}$ is input to an analog-to-digital converter 28. The analog-to-digital converter 28 converts the serial data ouput train $V_{01}$ to a parallel digital output signal $V_{out1}$ in response to the divided master clock signal. For each pulse of the first sample signal $V_{s1}$, one line of video data in the cross-track axis is thus produced.

As mentioned above, it is desirable to output video data from the second sensor 16 such that each line of video data in the cross-track axis produced by the second sensor 16 is simultaneously representative of exactly the same respective areas represented by each line of video data in the cross-track axis produced by the first sensor 12. However, due to possible misalignments between the sensors 12 and 16, and/or variations in the lenses through which each of the sensors 12 and 16 scan the same area, it is impossible to read the data from tne second sensor 16 with the same master clock signal Clkm and have the two lines of data properly aligned in real time.

In order to overcome these problems and have the data produced by the second sensor 16 read out in synchronism with the data produced by the first sensor 12, the present invention utilizes a phase-locked loop to produce novel, slaved, pliant clock signals for this purpose. The divided master clock signal is input to a frequency synthesizer 30 (e.g., a programmable frequency divider and a phase detector). The output of the frequency synthesizer 30 is input to a summer 32. The summer 32 produces a control voltage which is applied to a voltage-controlled oscillator 34. The voltage-controlled oscillator 34 produces a slaved clock signal Clks which is a pliant clock signal which is input to the frequency synthesizer 30. The frequency synthesizer 30 also receives input signals $V_{in1}$ for varying the frequency of the slaved clock signal Clks relative to the master clock signal Clkm (e.g., by programming a different frequency division factor for Clks/Clkm).

The divided master clock signal is also input to a programmable attenuator 36. The programmable attenuator 36 receives digital input signals $V_{in2}$ and produces an analog output signal responsive to both the digital input signals $V_{in2}$ and the divided master clock signal. The analog output signal produced by the programmable attenuator 36 is input to the summer 32. Thus the instantaneous frequency of the phase-locked loop may be changed during a given line readout cycle.

The slaved clock signal Clks produced by the voltage controlled oscillator 34 is input to a divider 38 set to a predetermined value such as ten. The divider 38 also receives digital input signals $V_{in3}$ for delaying the slaved clock signal Clks and thus introducing any desired relative phase shift between the slaved clock signal $C_{lks}$ and the master clock signal $C_{lkm}$. The divided, slaved clock signal $C_{lks}$ is then input to a second array driver 40 which produces a sampling signal $V_{s2}$ and clock signals $V_{\phi3}$ and $V_{\phi4}$ in response to the divided slaved clock signal $C_{lks}$. The second sample signal $V_{s2}$ and the clock signals $V_{\phi3}$ and $V_{\phi4}$ are input to the second sensor 16 and perform functions analogous to the first sample signal $V_{s1}$ and the clock signals $V_{\phi1}$ and $V_{\phi2}$. The analog data $V_{o2}$ serially output from the second sensor 16 is input to a second analog-to-digital converter 42 which also receives the divided master clock signal. The second analog-to-digital converter 42 thus produces parallel digital video output signals $V_{out2}$ in response to the serial analog video data signals $V_{o2}$. The parallel digital output signals $V_{out2}$ are representative of the same image represented by the parallel data output signals $V_{out1}$ but are responsive to a different frequency of light.

The frequency synthesizer 30, summer 32 and voltage-controlled oscillator 34 form a phase-locked loop 44. The phase-locked loop 44 produces the slaved clock signals Clks which are locked in phase with the divided master clock signal. However, by delaying or advancing the phase of the slaved clock signal Clks relative to the master clock signal Clkm, the data in the second sensor 16 is read out in advance of, or subsequent to, the reading out of data from the first sensor 12. In this manner, offset in the cross-track axis due, for example, to mechanical misalignment (caused by changing temperatures, for example) of the first and second sensors 12 and 16 is compensated.

Differences in scale in the cross-track axis caused by lens variations may be compensated by controlling the average frequency of the slaved clock signal Clks relative to the master clock signal Clkm. This is accomplished by controlling the digital input signals $V_{in1}$ input to the frequency synthesizer 30 as mentioned above. Finally, by controlling the signal produced by the programmable attenuator 36 with the digital input signals $V_{in2}$, distortion in the cross-track axis may be corrected by changing the instantaneous frequency of the slaved clock signals. The signal produced by the programmable attenuator 36 is such that the frequency is cyclically varied (e.g., in accordance with a parabolic function) along the cross-track axis. Thus, the slaved clock signals Clks produced by the phase-locked loop 44 may be controlled so as to provide compensation for offset, scale differences and distortion in the cross-track axis. The production of the pliant, slaved, clock signal Clks in this context is considered to be a major feature of the present invention.

Figure 2:
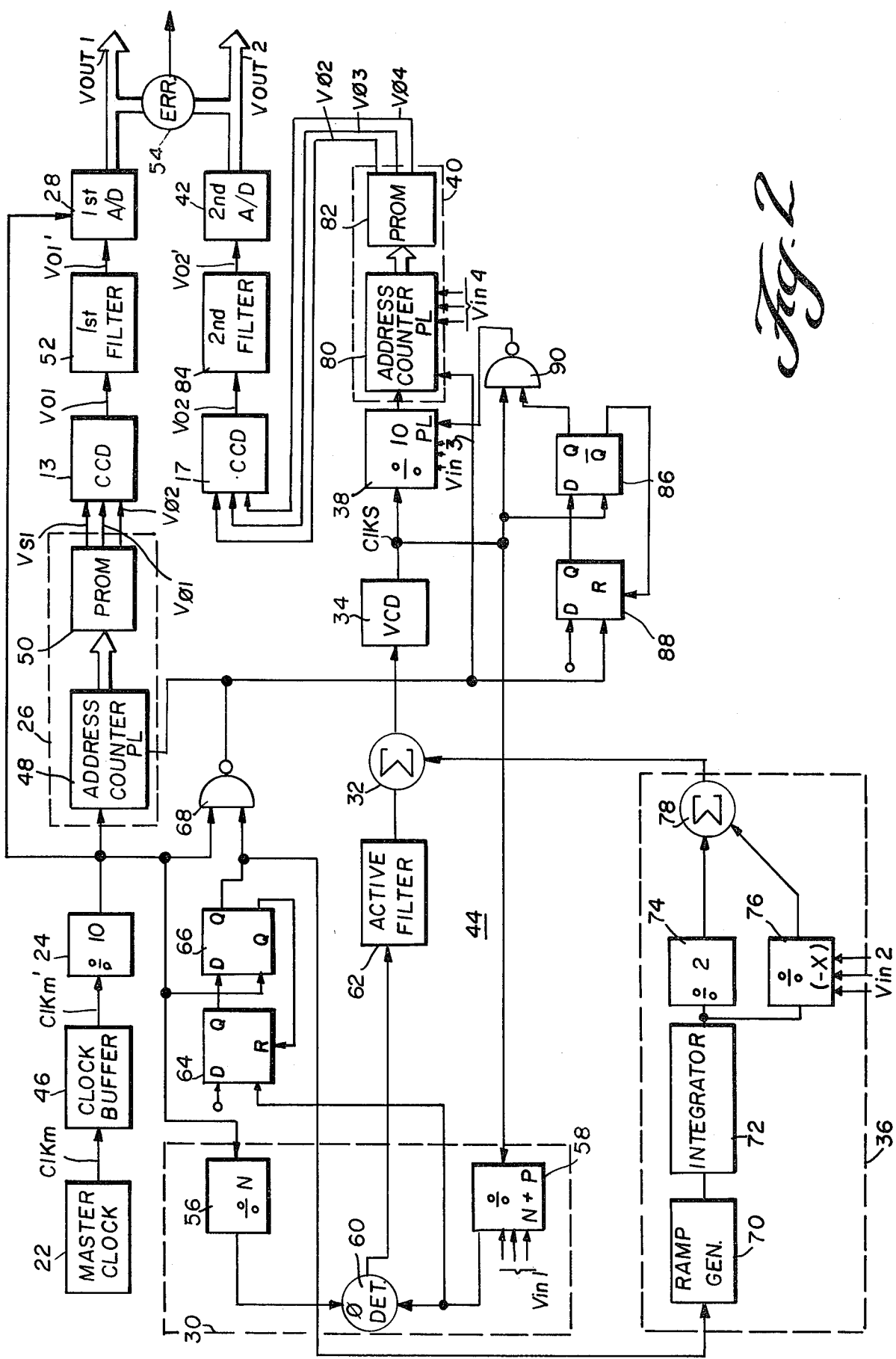
FIG. 2 illustrates the multisensor video imaging apparatus of FIG. 1 in greater detail.

In FIG. 2, the video imaging apparatus 10 of FIG. 1 is illustrated in greater detail. The master clock 22 produces the master clock signal Clkm which is input to a clock buffer 46. The clock buffer 46 may be a simple NAND gate such as a type 74S00 which receives the master clock signal Clkm at both input terminals. The buffered master clock signal Clkm' is input to the divider 24. The divider 24 may be a type 74LS196 integrated circuit. The divided, buffered, master clock signal is input to an address counter 48 which may typically be several 74LS191's. The address counter 48 counts the pulses of the divided, buffered, master clock signal. A programmable read only memory (PROM) 50 is responsive to the parallel output of the address counter 48. The programmable read only memory 50 is programmed so as to produce the first sampling signal $V_{s1}$ and the clock signals $V_{\phi1}$ and $V_{\phi2}$ in response to the output signals of the address counter 48. Together the address counter 48 and the programmable read only memory 50 form the first array driver 26 illustrated in FIG. 1.

The master clock signal Clkm has a frequency in one embodiment of 10 megahertz while the output from the divider 24 has a frequency of 1 megahertz. The address counter 48 therefore counts at a frequency of 1 megahertz in this embodiment.

It is desirable to read all of the data out of the charge coupled device 13 at a sufficiently fast rate of speed such that a blanking period may be inserted between lines of data produced by the charge coupled device 13. The time required to reac the data from the charge coupled device 13 plus the length of the blanking period is equal to a constant. In this manner, the time required to read data from other charge coupled devices can be advanced or retarded with respect to the time required for reading the data from the charge coupled device 13. By lengthening or shortening the blanking period of the other charge coupled devices the retrieval of data from all the charge coupled devices may be coordinated.

The serial video data $V_{01}$ output from the charge coupled device 13 is input to a first conventional filter 52. The filtered serial data $V_{01}'$ is input to the first analog to digital converter 28 as in FIG. 1. The function of this filter is to attenuate clock feed through noise present in any CCD output signal and to smoothly interpolate between pixels. Thus this filter is basically of the low pass variety. The cut-off frequency and slope of this filter is a design compromise between meeting the above goals of signal smoothing and clock noise reduction and at the same time not reducing useful system MTF (Modulation Transfer Function). A 7 pole Gaussian filter scaled to be $-6dB$ at the Nyquist limit ($\frac{1}{2}$ of the sampling rate) is a good compromise. The first analog to digital converter 28 produces the parallel video data output signals $V_{out1}$ which are available for transmission to a base station. This completes the retrieval of data from the first charge coupled device 13 by the divided, buffered, master clock signal.

The frequency synthesizer 30 may be a large scale integrated circuit (LSI) such as the Motorola MC145151L phase-locked loop frequency synthesizer. This circuit has a first programmable divider 56 for receiving the divided, buffered, master clock signal and a second programmable divider 58 for receiving the slaved clock signal Clks. The second programmable divider 58 also receives the input signals $V_{in1}$. The output of the dividers 56 and 58 is input to a phase detector 60. The output of the phase detector 60 is input to an active filter 62, the output of which is input to the summer 32. The active filter 62 is of conventional design and may be built around an operational amplifier such as a 741.

In a video imaging device 10 utilizing charge coupled devices having 1,024 picture elements, or pixels, the first divider 56 divides the buffered divided master clock signal by a value of 1,024. The combination of the dividers 24 and 56 provides a clock signal input to the phase detector 60 which is 10,240 times slower than the master clock signal Clkm. The divider 58 divides the slaved clock signal Clks by a value of 10,240 plus or minus a constant P. By varying the value of this constant, the signal input to the phase detector 60 by the second divider 58 has a frequency less than or greater than the frequency of the signal provided by the first divider 56. The constant is an even integer thereby facilitating phase-lock between the slaved clock signal Clks and the master clock signal Clkm. The divisor of the second divider 58 is determined by the input signals $V_{in1}$.

When the constant P of the second divider 58 is set to zero and no analog input signal is input to the summer 32, the frequency of the slaved clock signal Clks is the same as the frequency of the master clock signal Clkm. By varying the value of the constant of the second divider 58, the average frequency of the slaved clock signal Clks is varied. The variation of the average frequency of the slaved clock signal Clks corrects for scale differences as discussed above. The digital input to the second divider 58 may be calculated (e.g., based upon comparisons of known landmarks in different resulting images) and updated approximately monthly, for example, by signals transmitted from a ground station.

The clock signal produced by the second divider 58 is input to clock input terminal of a first flip-flop 64. A D-input terminal of the flip-flop 64 receives an input voltage representative of a binary one. A Q-output terminal of the flip-flop 64 is connected to a D-input terminal of a second flip-flop 66. A clock input terminal of the second flip-flop 66 receives the buffered, divided, master clock signal. A Q-output terminal of the flip-flop 66 is connected to a reset terminal R of the flip-flop 64. A Q-output terminal of the flip-flop 66 is connected to an input terminal of NAND gate 68. A second input terminal of the NAND 68 receives the buffered, divided, master clock signal. An output terminal of the NAND gate 68 is connected to a terminal PL of the address counter 48. The flip-flops 64 and 66 together with the NAND gate 68 insure that the address counter 48, and hence the first sampling signal $V_{s1}$ and the clock signals $V_{\phi1}$ and $V_{\phi2}$ are coordinated with the master clock signal Clkm. The flip-flops may be 74LS74's while the NAND gate may be another 74500.

A signal produced at the Q-output terminal of the flip flop 66 is input to the programmable attenuator 36. The programmable attenuator 36 is comprised of a ramp generator 70, an integrater 72, a first divider 74, a second divider 76 and a summer 78. The ramp generator 70, integrater 72 and summer 78 may be built around operational amplifiers such as 741's. The function of the first divider 74 may be provided by appropriate resistors while the function of the second divider 76 is provided by an AD7523JN. The ramp generator 70 produces a saw tooth waveform responsive to the signal produced at the Q-output terminal of the flip-flop 66. The saw tooth waveform is integrated by the integrater 72 producing a parabolic waveform. The parabolic waveform is input to the summer 78 through the first divider 74 and the second divider 76. The first divider 74 is maintained at a predetermined value such as two. The second divider 76 has a negative value that is programmable by varying the input signal $V_{in2}$. By setting the input signal $V_{in2}$ so that the value of the second divider 76 assumes a value of negative two, the analog output signal output by the programmable attenuator 36 and input to the summer 32 has a value of zero. By varying the input signal $V_{in2}$ above or below the value of negative two, the analog output signal output from the programmable attenuator 36 may be varied positively or negatively from zero. In this manner, the instantaneous clock frequency along the cross-track axis is cyclically varied thereby correcting for pin cushion lens distortion, for example, using a parabolic correction as discussed above. Other types of analog waveforms which repeat each line readout period may be used to correct for other types of distortion.

The slaved clock signal $C_{lks}$ produced by the voltage controlled oscillator 34 is input to the divider 38. The voltage controlled oscillator 34 may be an Erie 538-000B-7-25. The divider 38 also receives the input signals $V_{in3}$. The divided, slaved, clock signal is input to a programmable address counter 80. The programmable address counter 80 also receives digital input signals $V_{in4}$ and the signal produced by the NAND gate 68. The programmable address counter 80 may be programmed by the input signals $V_{in4}$ so as to delay counting the pulses of the divided, slaved, clock signal. This is equivalent to phase shifting the slaved clock signal Clks relative to the master clock signal Clkm so as to provide additional offset correction to that provided by the divider 38 as discussed above. The programmable address counter 80 and the divider 38 may be the aforementioned 74LS191 and 74LS196, respectively. The input signals $V_{in4}$ may be calculated daily, for example, and radioed to the satellite. A programmable read only memory 82 is responsive to the output signals produced by the programmable address counter 80 for producing the second sampling signal $V_{s2}$ and the clock signals $V_{\phi3}$ and $V_{\phi4}$. The programmable read only memory 82 and the programmable address counter 80 comprise the second array driver 40.

The serial data $V_{o2}$ output from the charge coupled device 17 in response to the second sampling signal $V_{s2}$ and the clock signals $V_{\phi3}$ and $V_{\phi4}$ are input to a second conventional filter 84. The filtered, serial, data $V_{o2}'$ is input to the second analog to digital converter 42. The second analog to digital converter 42 produces the parallel digital output video data $V_{out2}$ also available for transmission to a base station.

The slaved clock signal $C_{lks}$ produced by the voltage controlled oscillator 34 is input to a clock input terminal of a first flip-flop 86. A Q-output terminal of the first flip-flop 86 is connected to a reset input terminal R of a second flip-flop 88. A D-input terminal of the second flip-flop 88 receives a voltage representative of a binary one signal. A clock input terminal of the second flip-flop 88 is connected to the output terminal of the NAND gate 68. A Q-output terminal of the second flip-flop 88 is connected to a D-input terminal of the first flip-flop 86. A Q-output terminal of the first flip-flop 86 is connected to an input terminal of a NAND gate 90. A second input terminal of the NAND gate 90 receives the slaved clock signal Clks. An output terminal of the NAND gate 90 is connected to a terminal PL of the divider 38. The flip-flops 86 and 88 together with the NAND gate 90 coordinate the operation of the divider 38 with the slaved clock signal Clks. The flip-flops 86 and 88 and the NAND gate 90 may be the aforementioned 74LS74 and 74500, respectively. This concludes the description of FIG. 2.

Figure 3:
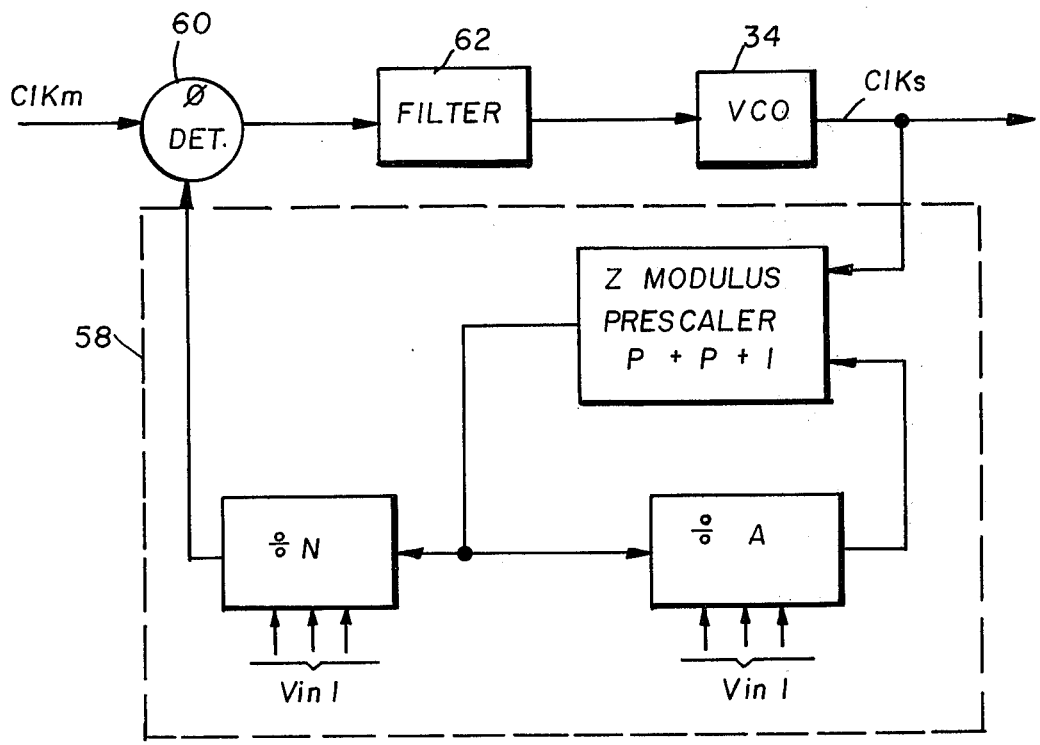
FIG. 3 illustrates a digital embodiment of portions of the multisensor video imaging apparatus of FIG. 2.
Figure 4:
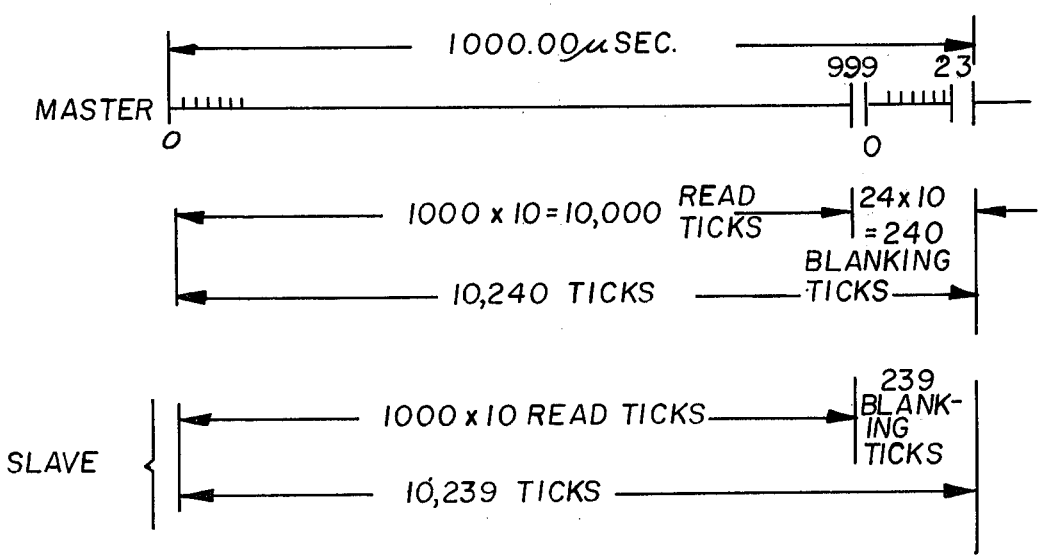
FIG. 4 is an example illustrating the master and slave pixel readout times.

In the above-described analog approach, resampling occurs automatically at the analog-to-digital conversion rate without the need for mapable memory or high speed interpolation electronics. However, compensation can also be achieved with a digital approach as illustrated in FIG. 3. To achievne subpixel registration let the master clock sig al Clkm run, for example, at ten times the nominal pixel dwell time. For example, let 1000 pixels be read followed by a 24 pixel blanking period. Let those two intervals be accomplished in an invariant interval of 1000 $\mu$S. From FIG. 4:

$$\text{Master pixel time} = \frac{1000.00 * 10^{-6} * 10}{10,240} = 97.6563 n\text{sec and}$$

$$\text{Slave pixel time} = \frac{1000.00 * 10^{-6} * 10}{10,239} = 97.6658 n\text{sec}$$

The time difference between the master pixel time and the slave pixel time is:

$$t = (97.6563 - 97.6563) * 10^{-9} \text{ sec}$$

$$t = 9.54 * 10^{-11} \text{ sec}$$

This corresponds to a scale resolution of:

$$\frac{9.54 \times 10^{-11}}{97.66 \times 10^{-9}} \simeq 10^{-3} \text{ pixel}$$

Offset in tne digital approach of FIG. 3 can be handled as in the analog approach of FIG. 2 by a phase shift of $0 \pm n$ ticks/sec in the starting position of the slaved clock signal relative to the master clock signal. The slaved clock signal in the cigital approach can be easily implemented by frequency synthesizer techniqes as seen in FIG. 3. Thus, offset and scale can be handled by a digital approach with its inherent stability. The example of FIG. 4 yields an offset resolution of 0.1 pixel.

Higher order correction terms can also be handled by expanding or compressing the 10X tick rate by $\pm 1$ as required so long as the sum is maintained as a constant (as determined by the first order).

Figure 5:
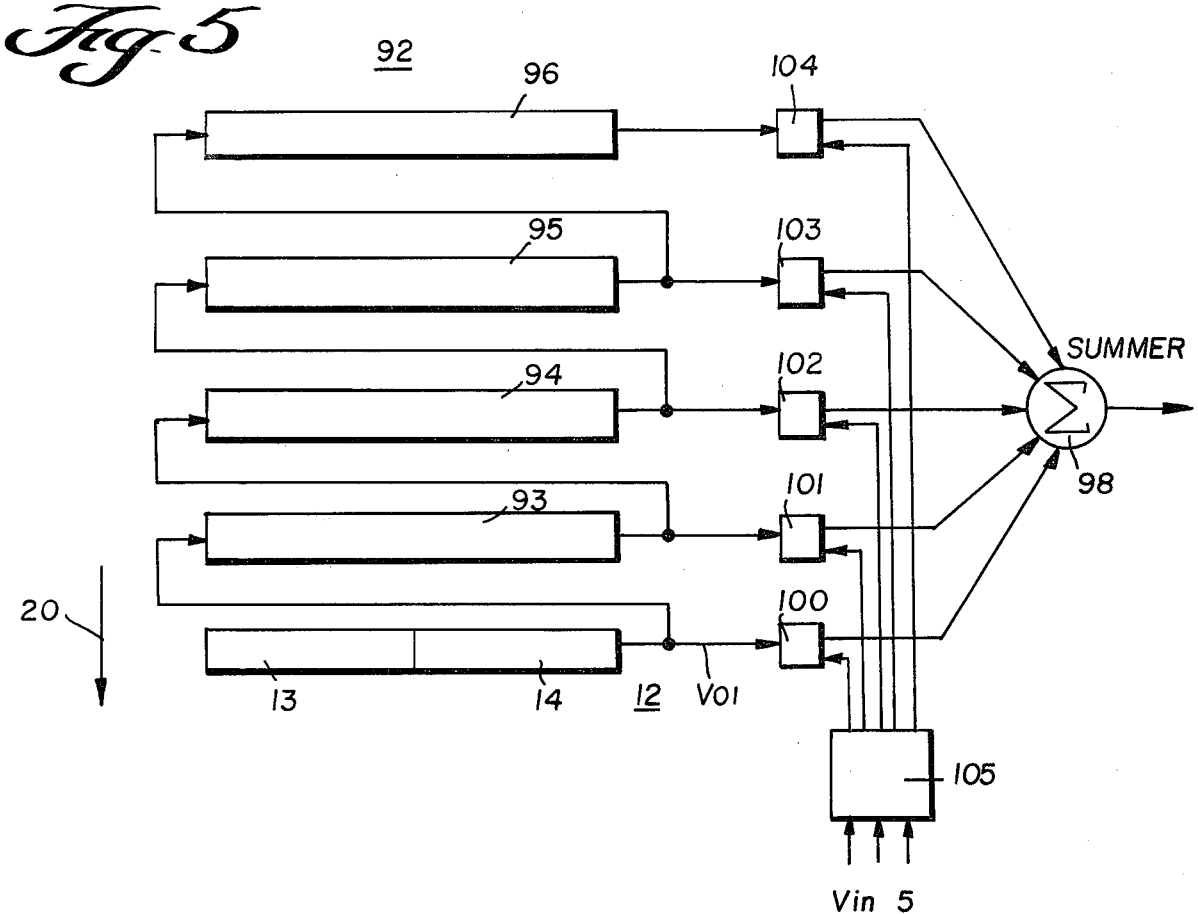
FIG. 5 illustrates an alternative embodiment of the present invention providing inter-pixel interpolation.

In FIG. 5 an additional optional embodiment of the present invention is illustrated. A four line analog memory 92 is comprised of a first, second, third and fourth registers 93 through 96, respectively. A first line of serial data $V_{o1}$ output from the first sensor 12 is input to a summer 98 through a first programmable attenuator 100 and is input to the first register 93 when a second line of data is produced by the sensor 12. The first line of serial output data $V_{o1}$ produced by the sensor 12 is now input from the first register 93 to the summer 98 through a second programmable attenuator 101 and is additionally input to the second register 94 when a third line of data is produced. The first line of data is now input from the second register 94 to the summer 98 through a third programmable attenuator 102. In a similar fashion, the first line of data is moved to the third register 95 and the fourth register 96 and is input to the summer 98 through programmable attenuators 103 and 104, respectively. The programmable attenuators 100 through 104 are under the control of a controller 105. The controller 105 receives input signal $V_{in5}$. Thus, at any time after the registers 93 through 96 are loaded, five lines of video data are simultaneously available to be serially input to the summer 98.

Assume the sensor 12 leads the sensor 16 illustrated in FIG. 1 by two pixels. With a four pixel delay, plus or minus two pixel compensation can be achieved. At any one time, one or more programmable attenuators (which act as multiplying digital-to-analog converters), contribute 100% of the input signal to the summer 98. For example, one-eighth of the signal may be provided by the first register 93 and seven-eighths of the signal may be provided by the second register 94. In this manner, a weighted average may be produced from each five adjacent lines of data so as to allow inter-pixel interpolation. The programmable attenuators 100 through 104 may be updated along the cross-track axis as time progresses in a cyclical manner with respect to the readout thereby introducing a rotational compensation at any desired angle with respect to the track axis 20 by adjusting the input signal $V_{in5}$.

Figure 6:
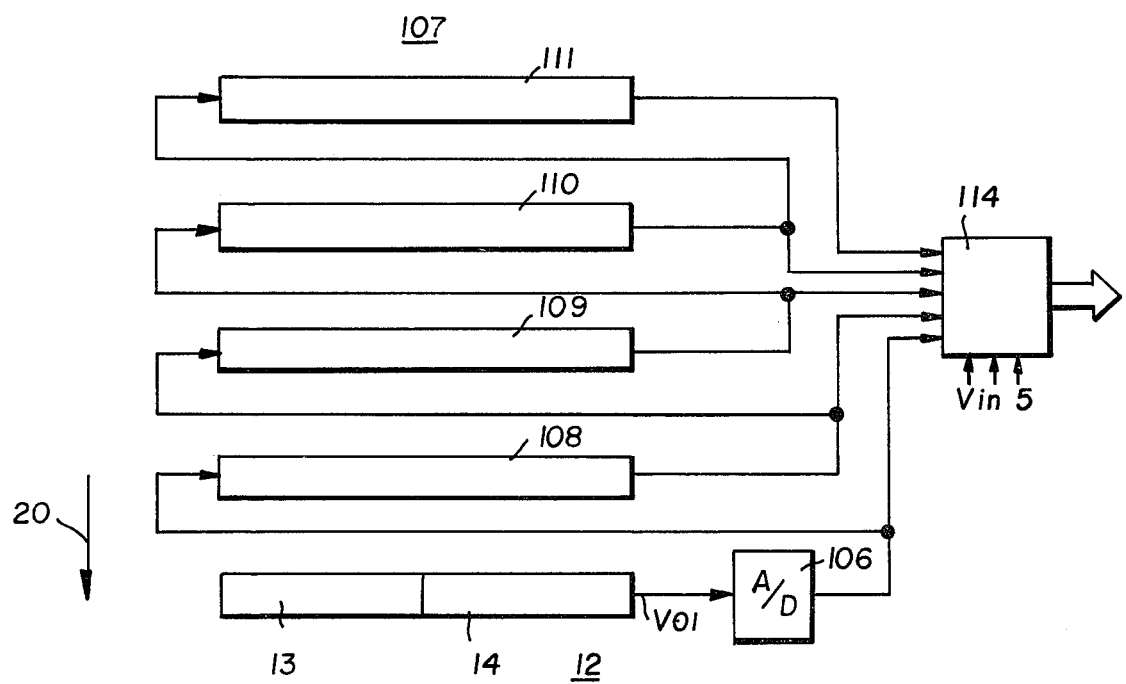
FIG. 6 illustrates a digital implementation of the embodiment of FIG. 5.

In FIG. 6. an alternative of the FIG. 5 embodiment utilizing a digital memory is illustrated. The first sensor 12 produces the serial data signal $V_{o1}$ which is input to a digital interpolation processor 114 through an analog to digital converter 106. A random access memory 107 is provided having registers 108, 109, 110 and 111 for storing the lines of data produced by the sensor 12 similar to registers 93 through 96 as in FIG. 5. Each of tne registers 108 through 111 outputs the serial digitized data to both the digital interpolation processor 114 and the next register. The digital interpolation processor 114 produces a parallel digital output signal which is a weighted combination of the five available lines of data. In this manner, a composite output signal may be produced which is a weighted average of the five available lines of data thus also allowing inter-pixel interpolation at any desired angle with respect to the track axis 20. The circuit illustrated in FIG. 6 provides approximately the same function as the circuit illustrated in FIG. 5 albeit in a digital manner.

The cross-track axis input signals $V_{in1}$, $V_{in2}$, $V_{in3}$ and $V_{in4}$ and the track axis input signal $V_{in5}$ can be computed on the ground and relayed to the satellite periodically or can be computed within the satellite itself. This later process is analogous to that of a broadcast color television camera with an automatic registration feature. In the case of a broadcast camera, the camera is aimed at a special registration chart. The satellite could accomplish registration while flying over an identifiable object such as an interstate highway system. A one or two dimensional image correction subsystem could be used to achieve this task.

In summary, the present invention is for a video imaging appa-atus having one sensor (e.g., comprised of arrays of charged coupled devices) driven by a master clock signal and a second sensor (e.g., comprised of arrays of charged coupled devices) driven by a slaved, pliant, clock signal. Each slaved pliant clock signal is produced by a respective phase-locked loop having up to three independent control inputs. By controlling the phase of the slaved clock signal relative to the master clock signal offset correction is acheived. Controlling the average frequency of the slaved clock signal relative to the master clock signal corrects for scale differences while cyclically varying the instantaneous clock frequency of the slaved clock signal along the cross-track axis during each line read-out period corrects for lens distortion. The specific embodiments described herein are intended for purposes of illustration and are not intended to imply any limitation. For example, it may also be advantageous to provide slaved clock signals for reading the data from each array of charge coupled devices with n each sensor. These and all other variations and modifications of this invention within the scope of the appended claims are considered to constitute a part of this invention.

What is claimed is:

1. An improved multisensor video imaging apparatus of the type using plural linear arrays of elemental electrical transducers nominally fixed with respect to one another with each array's longitudinal axis functionally oriented in a "cross track" direction substantially perpendicular to a "track axis" along which the arrays are simultaneously moved relative to a scanned area so as to successively scan, in nominal synchronism, corresponding common incremental portions of that area, said improvement comprising:

first and second linear arrays of elemental electrical transducers, each elemental transducer being capable of generating an electrical signal representative of its incident illumination and each array being capable of sampling and reading out a series of respectively corresponding electrical signals in response to applied clock signals;

master clock means for providing master clock signals and first arrayed driver means connected thereto and to said first array to control the sampling and reading of electrical signals output from said first array of electrical transducers; and a controlled oscillator circuit means for providing pliant clock signals and second array driver means connected thereto and to said second array to control the sampling and reading of electrical signals output from said second array of electrical transducers;

said controlled oscillator circuit means being connected to said master clock means for nominal control by said master clock signal but also having at least one supplemental control signal input for controllably varying the timing of said pliant clock signals with respect to said master clock signals so as to controllably maintain desired synchronism with respect to said cross-track axis between the sampling and reading of electrical signals output from said first and second arrays of electrical transducers.

2. An improved multisensor video imaging apparatus as in claim 1 wherein said controlled oscillator circuit means comprises a phase-locked loop including phase control means for controlling the relative phase of said pliant clock signals.

3. An improved multisensor video imaging apparatus as in claim 1 wherein said controlled oscillator circuit means comprises a phase-locked loop including average frequency control means for controlling the average relative frequency of said pliant clock signals.

4. An improved multisensor video imaging apparatus as in claim 1 wherein said controlled oscillator circuit means comprises a phase-locked loop including instantaneous frequency control means for controlling the instantaneous relative frequency of said pliant clock signals.

5. An improved multisensor video imaging apparatus as in claim 2 wherein said controlled oscillator circuit means comprises a phase-locked loop including average frequency control means for controlling the average relative frequency of said pliant clock signals.

6. An improved multisensor video imaging apparatus as in claim 2 wherein said controlled oscillator circuit means comprises a phase-locked loop including instantaneous frequency control means for controlling the instantaneous relative frequency of said pliant clock signals.

7. An improved multisensor video imaging apparatus as in claim 5 wherein said controlled oscillator circuit means comprises a phase-locked loop including instantaneous frequency control means for controlling the instantaneous relative frequency of said pliant clock signals.

8. An improved multisensor video imaging apparatus as in claim 3 wherein said controlled oscillator circuit means comprises a phase-locked loop including instantaneous frequency control means for controlling the instantaneous relative frequency of said pliant clock signals.

9. An improved multisensor video imaging apparatus as in claim 1 wherein said controlled oscillator circuit means comprises:

a phase-locked loop including an oscillator controlled by an electrical control signal and producing at an output thereof said pliant clock signals;

a first clock pulse divider circuit connected to said oscillator output to count and divide the pliant clock signals by a controllable factor thus producing a lower frequency pliant clock signal at an output;

a second clock pulse divider circuit connected to said master clock means to receive, count and divide the master clock signals thus producing a lower frequency master clock signal;

controllable time delay means connected to the output of the first clock pulse divider circuit to delay said lower frequency pliant clock signals with respect to said lower frequency master clock signal thus providing a controllably delayed lower frequency pliant clock signal;

phase comparison means connected to said second clock pulse divider circuit and to said time delay means to compare the relative phases of said lower frequency master clock signal and said controllably delayed lower frequency pliant clock signal and to produce an output representative of the detected phase difference therebetween; and summation means connected to the output of said phase comparison means to supplement the output from said phase comparison means with at least one further controllable input signal and to produce said electrical control signal for said oscillator in response thereto;

whereby said desired synchronism may be maintained by controlling the first clock pulse divider circuit, the controllable time delay means and said summation means so as to compensate respectively for differences in scale, offset and optical distortion between said arrays.

10. An improved multisensor video imaging apparatus as in claim 1, 2, 3, 4, 5, 6, 7, 8 or 9 comprising:

further linear arrays of said elemental electrical transducers; and further respectively corresponding said controlled oscillator circuit means, one being provided for each said further linear array, each said further controlled oscillator circuit means being connected to said master clock means for nominal control by said master clock signal but also having at least one supplemental control signal input for controllably varying the timing of each of the resulting further plaint clock signals with respect to said master clock signals so as to controllably maintain desired synchronism with respect to said cross track axis.

11. An improved multisensor video imaging apparatus as in claim 1, 2, 3, 4, 5, 6, 7, 8 or 9 further comprising:

a two-dimensioned array of data memory devices incorporating a separate linear shift register for each of plural sets of electrical data signals taken from one of said sensor arrays, said registers being arranged to receive successive such sets of said electrical data signals and to temporarily store a plurality of the most recent such sets while also providing separate delayed individual electrical data signals at an output of each said shift registers;

a multiplying digital-to-analog converter for each of said shift registers connected to receive its said successively delayed individual electrical data signals and to convert them to a corresponding analog output signal multiplied by a controllable factor; and signal summation means connected to sum all of the thus weighted analog output signals thus providing the ability to controllably interpolate between said electrical data signals with respect to the track axis and thus to compensate for relative misalignments between said sensor arrays in the track axis direction.

12. An apparatus for scanning an area during relative motion in a direction defining a track axis, comprising:

at least two linear sensor arrays each oriented substantially perpendicular to said track axis thereby defining a cross-track axis, said arrays being substantially fixed relative to each other and oriented for simultaneously scanning the same said area and each temporarily storing plural electrical data signals representative of a corresponding array of incremental portions of said area;

clock means for producing a master clock signal;

means for retrieving a series of electrical data signals from one of said sensor arrays in response to said master clock signal;

a voltage controlled oscillator for producing a slave clock signal;

means for retrieving a series of electrical data signals from the other said sensor array in response to said slave clock signal;

means for variably delaying said slave clock signal; and phase detection means for comparing said slave clock signal and said master clock signal, said phase detection means controlling said voltage controlled oscillator in response to said comparison so as to coordinate said retrieval of electrical data signals from said sensor arrays.

13. The apparatus of claim 12 used in conjunction with at least one optical lens through which the sensor arrays optically scan said area and including a programmable attenuator responsive to the master clock signals, and wherein the voltage controlled oscillator is responsive to both said programmable attenuator and the phase detection means so as to compensate for distortion due to the optical lens.

14. The apparatus of claim 12 including means for variably dividing the master clock signal before input to said phase detection means and means for variably dividing the slave clock signal before input to said phase detection means so as to compensate for scaling errors.

15. The apparatus of claim 12 including means for separating electrical data signals retrieved from each of the arrays.

16. The apparatus of claim 12 including memory means for storing electrical data signals retrieved from at least one of said arrays, and including a plurality of multiplying, digital to analog converters responsive to said memory so as to weight certain portions of the data thereby compensating for misalignments between said arrays in the track axis.

17. An apparatus for scanning an area by moving thereover in a direction defining a track axis, comprising:

at least two linear sensor arrays each being substantially fixed with respect to one another and oriented perpendicular to said track axis thereby defining a cross-track axis, said arrays being oriented for substantially simultaneously scanning the same area and arranged to provide plural electrical data signals representative of a corresponding array of incremental portions of said area;

a clock for producing a master clock signal;

means for retrieving a series of electrical data signals from one of said sensor arrays in response to said master clock signal;

a voltage controlled oscillator for producing a slave clock signal;

means for retrieving a series of electrical data signals from the other said sensor array in response to said slave clock signal;

circuit means connected to said voltage controlled oscillator for varying both the phase and the frequency of said slave clock signal relative to said master clock signal;

a programmable attenuator responsive to said master clock signals for producing variable supplemental inputs to said voltage controlled oscillator, wherein said voltage controlled oscillator is controlled by both said circuit means and said programmable attenuator so as to compensate for cross-track misalignment, distortion and scaling errors.

18. The apparatus of claim 17 including means for separating electrical data signals retrieved from each of the sensor arrays.

19. An improved multisensor video imaging apparatus of the type using plural linear arrays of elemental electrical transducers nominally fixed with respect to one another with each array's longitudinal axis functionally oriented in a "cross track" direction substantially perpendicular to a "track axis" along which the arrays are simultaneously moved relative to a scanned area so as to successively scan, in nominal synchronism, corresponding common incremental portions of that area, said improvement comprising:

first and second linear arrays of elemental electrical transducers, each elemental transducer being capable of generating an electrical signal representative of its incident illumination and each array being capable of sampling and reading out a series of sets of respectively corresponding electrical signals in response to applied clock signals;

means for generating signals for sampling and reading of the electrical signals output from said arrays;

memory means for storing plural sets of said electrical signals output from at least one of said arrays; and means for producing a cyclical weighted output signal responsive to certain of said stored electrical signals thereby interpolating between said electrical signals with respect to the track axis and producing rotational compensation at an angle with respect to the track axis.

20. An improved multisensor video imaging apparatus as in claim 19 wherein the memory means includes a two-dimensioned array of data memory devices incorporating a separate linear shift register for each of the plural sets of electrical signals taken from one of said sensor arrays, said registers being arranged to receive successive such sets of said electrical signals and to temporarily store a plurality of the most recent such sets while also providing separate delayed individual electrical signals at an output of each said shift registers.

21. An improved multisensor video imaging apparatus as in claim 20 wherein the means producing the weighted output signal includes a signal summation means and includes a multiplying digital-to-analog converter for each of said shift registers connected to receive its said successively delayed individual electrical signals and to convert them to a corresponding analog output signal multiplied by a controllable factor, said signal summation means being connected to sum all of the thus weighted analog output signals thus providing the ability to controllably interpolate between said electrical data signals with respect to the track axis and thus to compensate for relative misalignments between said sensor arrays in the track axis direction.

22. An improved multisensor video imaging apparatus as in claim 19 wherein the means producing the weighted output signal includes a digital interpolation processor.

* * * * *